(12) United States Patent
Liu et al.

(10) Patent No.: US 7,782,450 B2
(45) Date of Patent: Aug. 24, 2010

(54) TESTING SYSTEM AND TESTING METHOD FOR KEYBOARD LIGHT OF MOBILE PHONE

(75) Inventors: Qing-Hua Liu, Shenzhen (CN); Yong-Hui Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 148 days.

(21) Appl. No.: 12/170,156

(22) Filed: Jul. 9, 2008

(65) Prior Publication Data

US 2009/0262338 A1    Oct. 22, 2009

(30) Foreign Application Priority Data

Apr. 21, 2008    (CN) .................. 2008 1 0301225

(51) Int. Cl.
*G01J 1/00* (2006.01)

(52) U.S. Cl. ..................................... 356/213

(58) Field of Classification Search ............... None
See application file for complete search history.

(56) References Cited

U.S. PATENT DOCUMENTS 7,301,534 B2 *   11/2007   Runolinna ............... 345/207
2008/0018570 A1 *   1/2008   Gerets ..................... 345/84

* cited by examiner

*Primary Examiner*—Tu T Nguyen
(74) *Attorney, Agent, or Firm*—D. Austin Bonderer

(57) ABSTRACT

A testing system includes a computer (10), a motherboard (31) of a mobile phone, a photosensitive component (33) and a measuring device. The motherboard of the mobile phone is connected to the computer. The motherboard of the mobile phone includes a keyboard light (313) disposed thereon. The photosensitive component is capable of sensing the brightness of the keyboard light. The measuring device is connected to the photosensitive component. The measuring device is capable of measuring the resistance of the photosensitive component and transmitting the resistance to the computer. The computer is capable of comparing the resistance with a pre-determined range of values to determine whether the keyboard light of the motherboard meets a standard.

16 Claims, 3 Drawing Sheets

TESTING SYSTEM AND TESTING METHOD FOR KEYBOARD LIGHT OF MOBILE PHONE

BACKGROUND

1. Field of the Invention

The present invention relates to testing systems and testing methods, and more particularly to a testing system and a testing method for a keyboard light of a mobile phone.

2. Description of Related Art

Mobile phones are becoming increasingly popular. To validate functions of a mobile phone, the mobile phone is tested before being shipped.

Although testing of a keyboard light of the mobile phone is important, it is typically done by workers through direct observation. It is up to the worker's judgment if a keyboard is lit properly. This method of testing is time consuming subject to human error.

What is needed, therefore, is a testing system and a testing method, which allows automatic testing of a keyboard light of a mobile phone.

DETAILED DESCRIPTION

Figure 1:
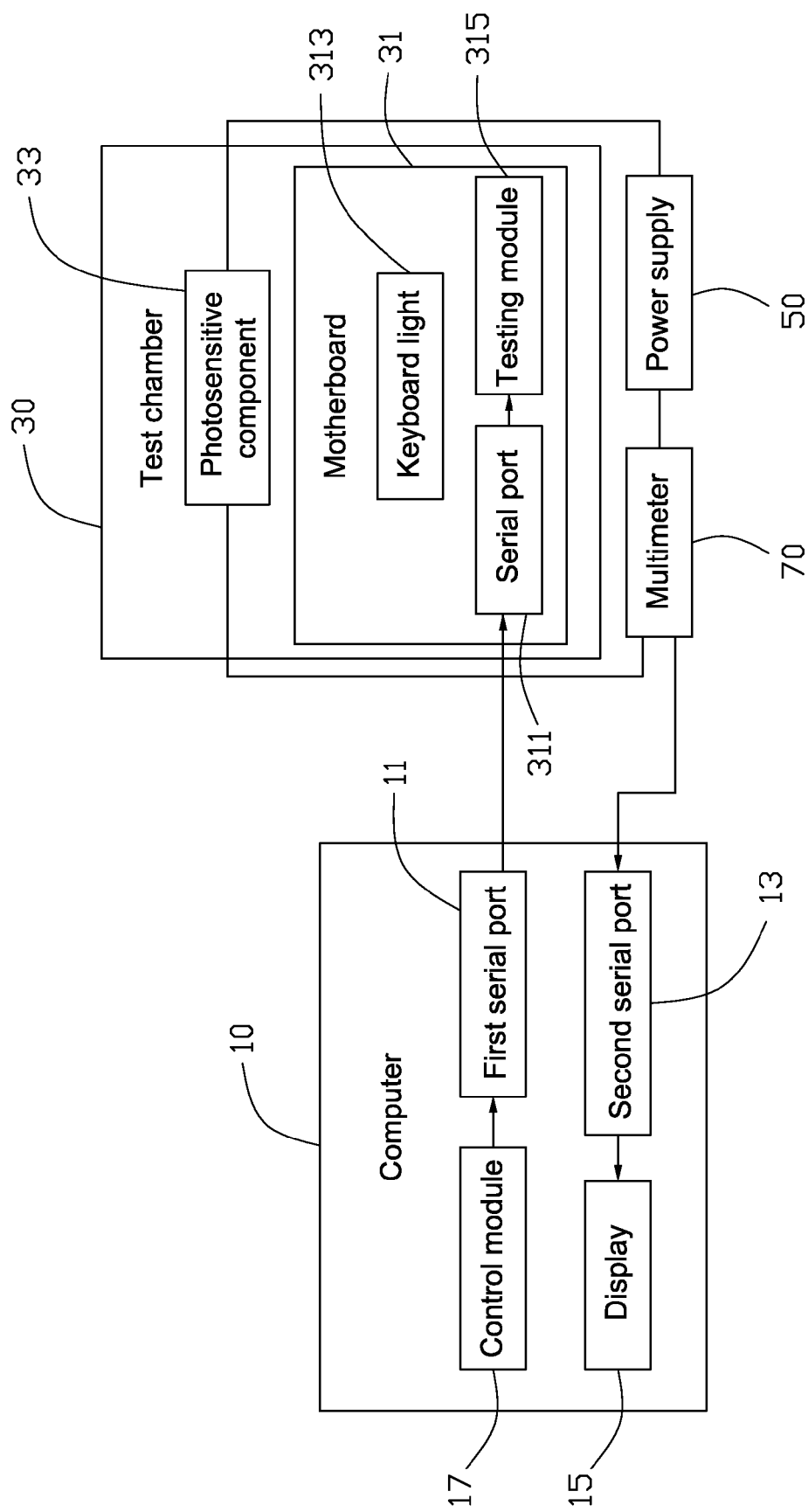
FIG. 1 is a schematic diagram of a connecting relationship of a testing system for a keyboard light of a mobile phone in the present invention.

Referring to FIG. 1, a testing system of an embodiment of the present invention is provided for testing whether a keyboard light of a mobile phone meets a predetermined standard. The testing system includes a computer 10, a test chamber 30, a power supply 50 and a measuring device. In the present embodiment, the measuring device is a multimeter 70.

Figure 2:
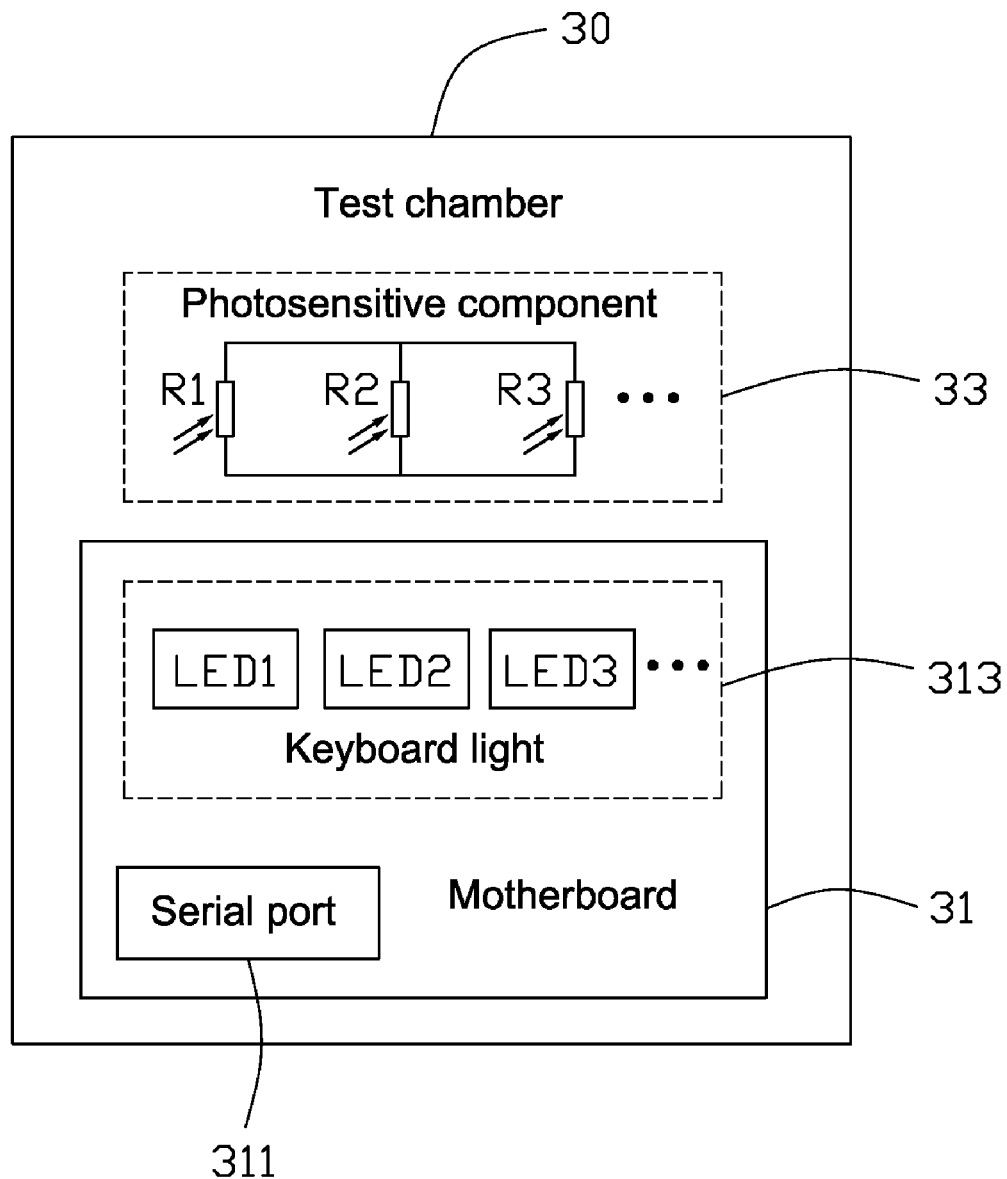
FIG. 2 is a schematic diagram of a connecting relationship in a test chamber of FIG. 1.

The computer 10 includes a first serial port 11, a second serial port 13 and a display 15 for displaying test data. The test chamber 30 is a closed chamber, and receives a motherboard 31 having a keyboard light 313 and a serial port 311 of a mobile phone and a photosensitive component 33 located above the motherboard 31 therein. Referring also to FIG. 2, the keyboard light 313 includes a plurality of light emitting diodes LED1, LED2, LED3, and the photosensitive component 33 includes a plurality of photosensitive resistors R1, R2, R3 connected in parallel. In this embodiment, the number of the photosensitive resistors is the same as that of the light emitting diodes. The photosensitive resistors R1, R2, R3 are each located to sense the brightness of a corresponding one of the light emitting diodes LED1, LED2, LED3.

The first serial port 11 of the computer 10 is connected to the serial port 311 of the motherboard 31. The photosensitive component 33, the multimeter 70, and the power supply 50 may be connected in series. The output terminal of the multimeter 70 is connected to the second serial port 13 of the computer 10.

A testing module 315 is embedded in the motherboard 31 of the mobile phone for automatically testing the keyboard light 313. A control module 17 is embedded in the computer 10 for starting up the testing module 315 of the motherboard 31. When the testing module 315 is started up, the light emitting diodes LED1, LED2, LED3 are turned on then off one at a time.

In testing the keyboard light 313, the control module 17 is started up first. Then the testing module 315 is started up by the control module 17 through the first serial port 11 and the serial port 311. The testing module 315 then turns on then off the light emitting diodes LED1, LED2, LED3 one at a time. When each light emitting diode LED1, LED2, LED3 is turned on, the resistance of the corresponding photosensitive resistor R1, R2, R3 is measured. If the light emitting diode that has been turned emits light then resistance of the corresponding photosensitive resistor will decrease; the amount of decrease corresponds to the brightness of the light emitting diode. The resistance of each photosensitive resistor R1, R2, R3 may be measured by the multimeter 70, and transmitted to the computer 10 through the second serial port 13. The computer 10 determines if the resistances fall within a pre-determined range of values stored in the computer 10. If the resistances are within the pre-determined range, the keyboard light 313 passes the test; otherwise, the keyboard light 313 fails. Other testing procedures can also be employed.

Figure 3:
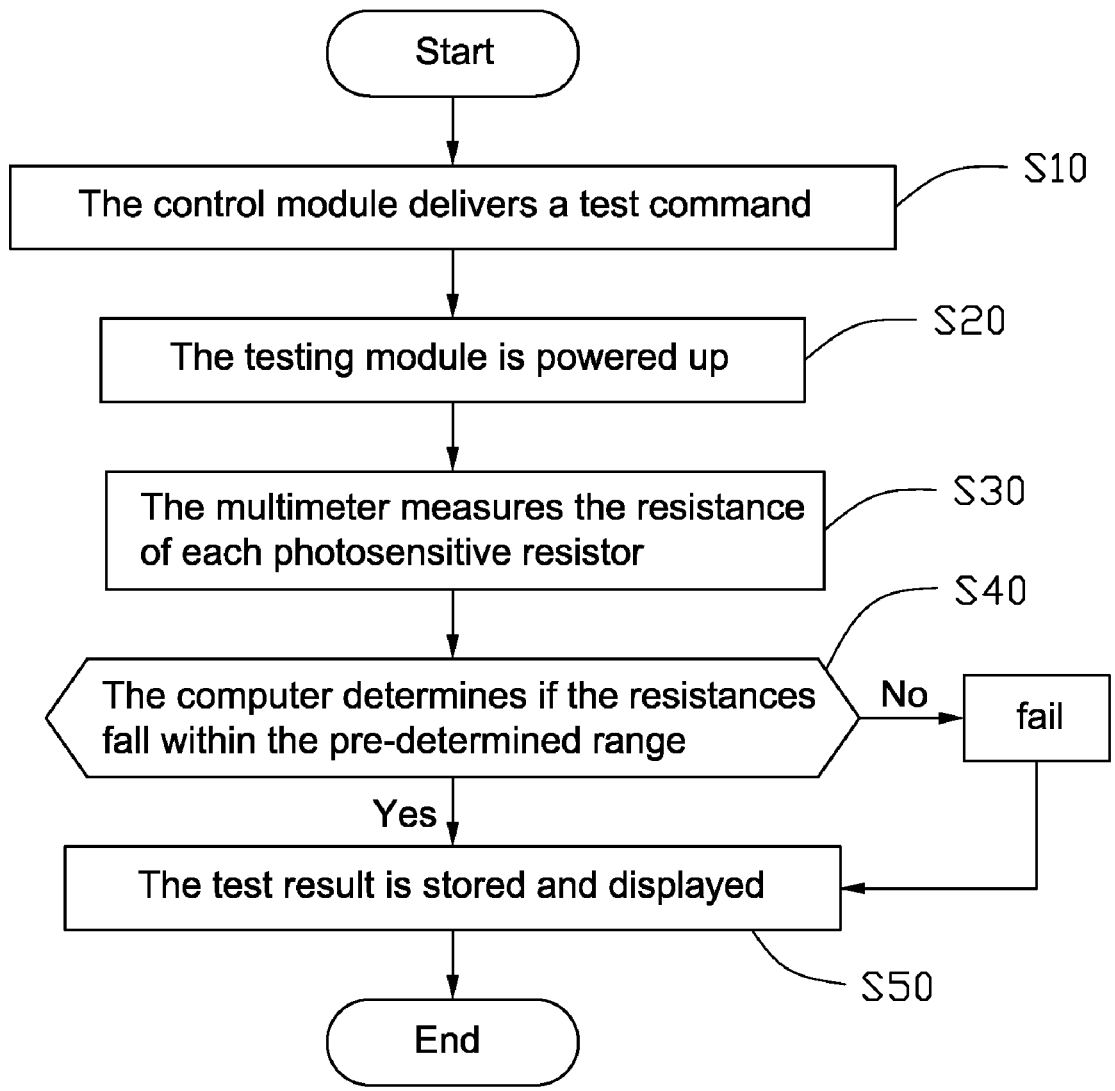
FIG. 3 is a flow chart of a testing method for a keyboard light of a mobile phone in the present invention.

Referring to FIG. 3, a testing method includes the following steps:

Step S10: The control module 17 in the computer 10 delivers a test command to the motherboard 31 of the mobile phone;

Step S20: The testing module 315 in the motherboard 31 is powered up. The light emitting diodes LED1, LED2, LED3 of the keyboard light 313 are turned on then off one at a time;

Step S30: The multimeter 70 measures the resistance of each photosensitive resistor R1, R2, R3 while its on, and transmits the resistances to the computer 10;

Step S40: The computer 10 determines if the resistances fall within the pre-determined range; if the resistances fall within the pre-determined range, the keyboard light 313 passes the test; if the resistance does not fall within the pre-determined range, the keyboard light 313 fails;

Step S50: The test result is stored in the computer 10, and displayed on the display 15. The testing process ends.

In other embodiments, the measuring device can measure the current through the photosensitive component 33, and the computer 10 can compare the current with a pre-determined range of values to determine whether the keyboard light 313 meets the standard.

Compared with conventional testing systems and methods, the testing system and method have the following advantages: first, testing is automatic, thus saving time and preventing human error; second, the results of the testing are more reliable and the efficiency of the testing is enhanced; third, testing method is simple and low cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A testing system, comprising:
    a computer;
    a motherboard of a mobile phone connected to the computer, the motherboard of the mobile phone comprising a keyboard light disposed thereon;

a photosensitive component being capable of sensing the brightness of the keyboard light;

a measuring device connected to the photosensitive component, the measuring device being capable of measuring the resistance of the photosensitive component and transmitting the resistance to the computer;

a testing module embedded in the motherboard of the mobile phone and capable of lighting the keyboard light, and a control module embedded in the computer and capable of starting up the testing module; and wherein the computer is capable of comparing the resistance with a pre-determined range of values to determine whether the keyboard light of the motherboard meets a standard.

2. The testing system as described in claim 1, wherein the motherboard of the mobile phone and the photosensitive component are located in a test chamber, and the photosensitive component being disposed above the keyboard light of the motherboard.

3. The testing system as described in claim 1, wherein the photosensitive component is connected to the measuring device through a power supply.

4. The testing system as described in claim 1, wherein the computer is connected to the motherboard of the mobile phone by a first serial port of the computer and a motherboard serial port.

5. The testing system as described in claim 4, wherein the computer is connected to the measuring device by a second serial port of the computer.

6. The testing system as described in claim 1, wherein the keyboard light comprises a plurality of light emitting diodes, the photosensitive component comprises a plurality of photosensitive resistors, and each photosensitive resistor being located above each light emitting diode.

7. The testing system as described in claim 1, wherein the computer comprises a display being capable of displaying the test result.

8. The testing system as described in claim 1, wherein the measuring device is a multimeter.

9. The testing system as described in claim 1, wherein the keyboard light comprises a plurality of light emitting diodes, the photosensitive component comprises a plurality of photosensitive resistors connected in parallel, and each photosensitive resistor being located above each light emitting diode and capable of sensing the brightness of each light emitting diode.

10. The testing system as described in claim 9, wherein only one of the plurality of light emitting diodes is turned on at any given time.

11. A testing method, comprising:

sensing the brightness of a keyboard light on a motherboard of a mobile phone by a photosensitive component;

measuring a resistance of the photosensitive component, and transmitting the resistance to a computer;

comparing the resistance with a pre-determined range of values; and determining whether the keyboard light of the motherboard meets a standard;

wherein the keyboard light comprises a plurality of light emitting diodes, the photosensitive component comprises a plurality of photosensitive resistors connected in parallel, and each photosensitive resistor being located above each light emitting diode and sensing the brightness of each light emitting diode.

12. The testing method as described in claim 11 further comprising placing the motherboard in a test chamber.

13. The testing method as described in claim 11, when determining, upon the condition that the resistance falls within the pre-determined range, the keyboard light of the motherboard of the mobile phone meets the standard.

14. The testing method as described in claim 11, wherein the testing method further comprises displaying the testing result on a display.

15. The testing method as described in claim 11, wherein the measuring is done by a measuring device, and a computer compares the current with the pre-determined range of values to determine whether the keyboard light of the motherboard meets the standard.

16. The testing method as described in claim 11, wherein only one of the plurality of light emitting diodes is turned on at any given time.

\* \* \* \* \*